(12) United States Patent
Iseli

(10) Patent No.: US 10,058,885 B2
(45) Date of Patent: Aug. 28, 2018

(54) PROCESS AND APPARATUS FOR COATING COMPOSITE PULP HONEYCOMB SUPPORT ELEMENTS

(71) Applicant: Fredy Iseli, Uttwil (CH)

(72) Inventor: Fredy Iseli, Uttwil (CH)

( * ) Notice: Subject to any disclaimer, the term of this patent is extended or adjusted under 35 U.S.C. 154(b) by 201 days.

(21) Appl. No.: 14/787,603

(22) PCT Filed: Apr. 11, 2014

(86) PCT No.: PCT/EP2014/057425
§ 371 (c)(1),
(2) Date: Oct. 28, 2015

(87) PCT Pub. No.: WO2014/177370
PCT Pub. Date: Nov. 6, 2014

(65) Prior Publication Data
US 2016/0102434 A1 Apr. 14, 2016

(30) Foreign Application Priority Data
Apr. 29, 2013 (DE) .................. 10 2013 104 318

(51) Int. Cl.
*B31D 3/02* (2006.01)
*B32B 3/12* (2006.01)
(Continued)

(52) U.S. Cl.
CPC ............ *B05C 7/04* (2013.01); *B05C 5/005* (2013.01); *B05C 11/1039* (2013.01);
(Continued)

(58) Field of Classification Search
CPC .. D21H 5/0002; D21H 5/0005; D21H 5/0007; D21H 11/16; D21H 19/00;
(Continued)

(56) References Cited

U.S. PATENT DOCUMENTS

| 2,553,054 A | 5/1951 | Lincoln et al. |
| 3,033,734 A | 5/1962 | Price |

(Continued)

FOREIGN PATENT DOCUMENTS

| CN | 102529188 A | 7/2012 |
| CN | 202572701 U | 12/2012 |

(Continued)

OTHER PUBLICATIONS

International Search Report for PCT/EP2014/057425 dated Aug. 13, 2014.

*Primary Examiner* — William P Fletcher, III
(74) *Attorney, Agent, or Firm* — Bachman & LaPointe, PC

(57) ABSTRACT

A coating device for coating composite cellulose honeycomb support parts (1) each having a multiplicity of channels (5, 6) extending in an axial direction with an impregnation coating to increase fire, water-resistance and/or mechanical stability of the support parts (1). A conveyor (8) transports the support parts (1) in a conveying direction along a filling station (9) configured to pour impregnation agent (12) from above into the channels (5, 6), and damming agents (16) are configured such that the impregnation agent (12) is prevented or at least delayed from draining downwards out of the channels (5, 6) such that the impregnation agent (12) builds up in the channels (5, 6). An emptying station (19) is arranged downstream of the filling station (9) in the conveying direction, at which emptying station excess impregnation agent (12) drains out of the channels (5, 6) in the composite cellulose honeycomb support parts (1). A corresponding process is also disclosed.

13 Claims, 1 Drawing Sheet

(51) Int. Cl.

| | | |
|---|---|---|
| *B05D 7/22* | (2006.01) | |
| *B05C 7/04* | (2006.01) | |
| *B29D 99/00* | (2010.01) | |
| *B32B 29/00* | (2006.01) | |
| *B05C 5/00* | (2006.01) | |
| *B05C 11/10* | (2006.01) | |
| *B05C 13/02* | (2006.01) | |
| *D21H 23/48* | (2006.01) | |
| *B29K 311/12* | (2006.01) | |

(52) U.S. Cl.
CPC ............ *B05C 13/02* (2013.01); *B05D 7/22* (2013.01); *B29D 99/0089* (2013.01); *B31D 3/02* (2013.01); *B31D 3/0292* (2013.01); *B32B 3/12* (2013.01); *B32B 29/005* (2013.01); *D21H 23/48* (2013.01); *B29K 2311/126* (2013.01); *B32B 2250/26* (2013.01); *B32B 2260/028* (2013.01); *B32B 2260/046* (2013.01); *B32B 2307/3065* (2013.01); *B32B 2307/7265* (2013.01)

(58) Field of Classification Search
CPC ........ D21H 19/74; D21H 19/82; D21H 23/00; D21H 23/32; D21H 23/46; D21H 23/48; D21H 23/50; D21H 23/66; D21H 23/68; D21H 25/08; B05C 5/004; B05C 5/005; B05C 5/0204; B05C 5/0208; B05C 7/02; B05C 7/04; B29D 99/0089; B31D 3/02; B31D 3/0223; B32B 3/12; B32B 2250/26; B32B 2260/028; B32B 2260/046; B32B 2307/3065; B32B 2307/50; B32B 2307/726; B32B 2307/7265; B32B 2307/73; B32B 2419/00; E04C 2/365; E04C 3/08; E04C 3/083; B29L 2031/608; B05D 5/00; B05D 7/22; B05D 7/24; B05D 2203/22; B05D 1/02; B05D 1/26; B05D 1/30; B05D 1/305
USPC ............... 162/135, 137, 136, 182, 119, 265; 428/292.7, 503, 511, 537.5, 116, 593, 73, 428/35.6, 530, 292.4, 351; 118/118, 118/DIG. 004, 306, 317, 254, 408; 442/295, 297, 414, 76, 77, 79; 5/483, 5/484; 52/793.1; 264/177.12; 427/230, 427/235, 372.2, 391, 411; 181/288, 292
See application file for complete search history.

(56) References Cited

U.S. PATENT DOCUMENTS

| | | | | |
|---|---|---|---|---|
| 4,609,563 | A * | 9/1986 | Shimrock | B01J 37/0215 118/50 |
| 5,305,577 | A * | 4/1994 | Richards | B28B 1/525 428/218 |
| 5,462,623 | A | 10/1995 | Day | |
| 5,953,832 | A * | 9/1999 | Rosynsky | B01J 37/0215 34/403 |
| 6,253,530 | B1 * | 7/2001 | Price | E04L 31/12 156/71 |
| 6,584,740 | B2 * | 7/2003 | Record | E04L 31/14 52/270 |
| 7,010,897 | B1 * | 3/2006 | Kuppers | E04C 2/3405 52/783.1 |
| 7,225,596 | B2 * | 6/2007 | Wrass | E04B 7/22 52/198 |
| 9,643,378 | B2 * | 5/2017 | Ho | B32B 3/12 |
| 2001/0026838 | A1 * | 10/2001 | Dettling | B01J 23/63 427/230 |
| 2008/0145531 | A1 * | 6/2008 | Rosynsky | B05D 3/042 427/231 |
| 2009/0155475 | A1 * | 6/2009 | Goshima | B01J 35/04 427/421.1 |

FOREIGN PATENT DOCUMENTS

| | | |
|---|---|---|
| DE | 3631185 A1 | 3/1988 |
| DE | 19654672 A1 | 2/1998 |
| DE | 19820493 A1 | 11/1999 |
| DE | 10305747 A1 | 8/2004 |
| DE | 202010003580 U1 | 7/2010 |
| EP | 0622174 A1 * | 2/1994 |
| EP | 0622174 A1 | 11/1994 |
| WO | 8602039 A1 | 4/1986 |
| WO | 2008076404 A2 | 6/2008 |
| WO | 2008094966 A1 | 8/2008 |
| WO | WO 2008/094966 A1 * | 8/2008 |
| WO | 2008122616 A1 | 10/2008 |
| WO | 2012045653 A1 | 4/2012 |

\* cited by examiner

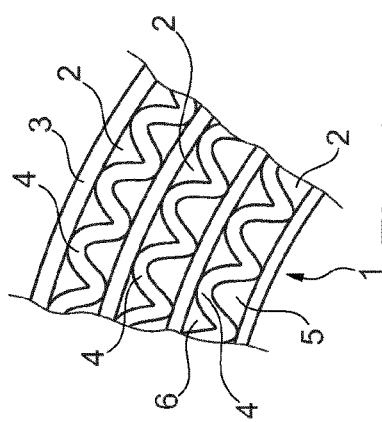
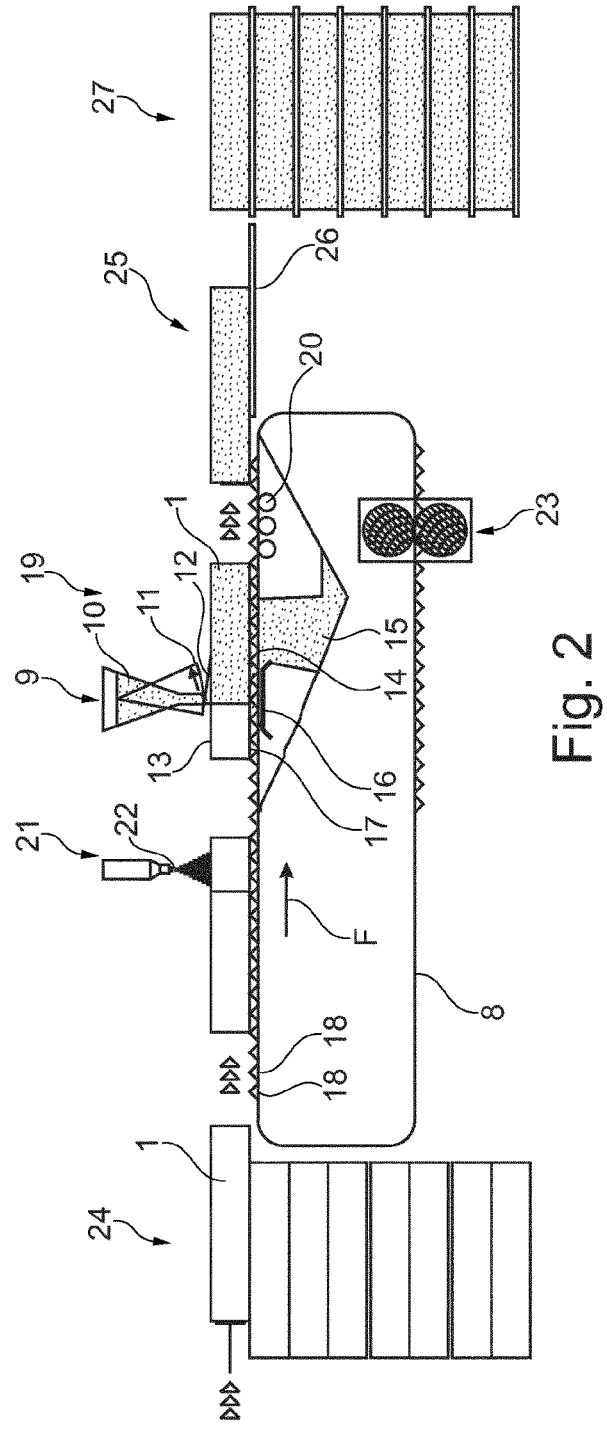

PROCESS AND APPARATUS FOR COATING COMPOSITE PULP HONEYCOMB SUPPORT ELEMENTS

BACKGROUND OF THE INVENTION

The invention relates to a coating device for coating composite pulp (cellulose) honeycomb support elements, each having a multiplicity of passages extending in an axial direction, with an impregnation coating for the purpose of increasing the fire and/or water resistance and/or the mechanical stability. The invention furthermore relates to a coating method for the purpose of coating such pulp sheets.

Composite honeycomb support elements are of known art, in particular when deployed as a honeycomb core material in composite sheets, wherein the honeycombs of the composite honeycomb support elements are formed from a multiplicity of passages extending in an axial direction, which as a rule are peripherally bounded by carrier papers, together with corrugated papers glued together with the carrier papers.

A method for the manufacture of composite honeycomb support elements is, for example, described in DE 103 05 747 A1. Other composite honeycomb support elements (corrugated box support elements) are shown in DE 196 54 672 A1 and DE 198 20 493 A1.

DE 20 2010 003 580 U1, DE 196 54 672 A 1 and WO 2008/076404 A2 are cited as further prior art.

From DE 36 31 185 A1 a method for the manufacture of composite paper honeycomb mouldings is of known art, in which a paper honeycomb element, i.e. a composite honeycomb support element with a multiplicity of axial passages, is coated with a curable fluid synthetic resin system. For the coating process the composite honeycomb support element is immersed in an immersion tank filled with the synthetic resin system, wherein the space above the immersion tank is evacuated. While the synthetic resin systems coming into use possibly increase the water resistance, they do not increase the fire resistance of the composite honeycomb support element. Moreover, large-scale use of the method of known art turns out to be difficult, because only a batch process can be undertaken. Also, with the method of known art the passages of the composite honeycomb support element cannot be coated with aqueous impregnation agents, since the paper honeycombs suck up the water and thereby lose strength; the honeycomb structure becomes soft and thereby disintegrates.

The applicant has overcome the disadvantages of the method of known art from DE 36 31 185 A1 with the method described in WO 2012/045653 A1. From the publication it is of known art to coat the composite pulp honeycomb support elements in a vacuum coating chamber with impregnation agent, wherein the impregnation agent is caused to swirl in the vacuum coating chamber. This method has proved itself. However, efforts are still being made to achieve simpler and more cost-effective coating options. In particular the throughput, i.e. the quantity of coated composite pulp honeycomb support elements per unit time, should be increased.

From WO 86/02039 a method for the manufacture of a light-build core is of known art, wherein the passages of the light-build core are formed from paper rolls. The axial passages are impregnated, in that impregnation resin, i.e. no inorganic impregnation agent, is filled in from above. As it is described in the publication, a large quantity of impregnation resin remains adhered to the surfaces that are to be wetted. Excess resin runs out downwards. The coating device of known art does not operate continuously, but rather in batch mode, which is disadvantageous with regard to the coating rate. Moreover, the coating device and the coating method of known art are not suitable for coating with impregnation coatings containing cement, since these would clog up and/or soften the much thinner passages of corrugated board composite honeycomb support elements.

From WO 2008/094966 A1 it is of known art to coat a honeycomb structure with a material that can be thermally expanded (foam precursor). In a first variant of the method the honeycomb structure is transported along a "waterfall", with which the passages are flooded with a foam precursor, which in turn is blown out using compressed air. Such a procedure is only possible with the foam coating material as described, which has a low density and a high viscosity. If a cement coating were to be used, the passages would inevitably clog up. In accordance with an alternative form of embodiment, the honeycomb structure is fixed in position and the "waterfall" with the foam precursor is moved relative to the honeycomb body. Here too a compressed gas is used for the purpose of blowing out the excess plastic coating material.

The methods of known art are not suitable for the purpose of coating composite pulp honeycomb support elements with an impregnation coating, in particular, an impregnation coating containing cement for the purpose of increasing the fire and water resistance, and/or the mechanical stability.

In addition reference is made to U.S. Pat. No. 5,462,623 and WO 2008/122616.

SUMMARY OF THE INVENTION

Based on the above-cited prior art, the task underlying the invention is that of specifying a robust method that can easily be executed for the purpose of coating composite pulp honeycomb support elements having a multiplicity of passages extending in an axial direction, which is characterised by a high throughput. In particular it should preferably be able to eliminate a vacuum coating chamber, which is comparatively cost intensive to operate. The task furthermore consists of specifying a correspondingly improved coating device.

With regard to the coating device this task is solved with the features of claim 1, and with regard to the coating method it is solved with the features of claim 11. Advantageous further developments of the invention are specified in the subordinate claims. All combinations of at least two of the features disclosed in the description, the claims, and/or the figures fall within the framework of the invention.

For the purpose of avoiding repetition, features disclosed in terms of the method should be deemed to be disclosed and claimable in terms of the device. Likewise, features disclosed in terms of the device should be deemed to be disclosed and claimable in terms of the method.

The concept underlying the invention is that of filling the passages of the composite pulp honeycomb support elements from above, preferably exclusively under the action of gravity, in particular in that impregnation agent is poured into the passages from above, still further preferably such that the composite pulp honeycomb support elements are transported with the aid of means of conveyance, preferably at atmospheric pressure, through a pouring curtain at a filling station, wherein coating over the whole of the periphery is ensured in that the outflow of the impregnation agent from the passages downwards in the filling region is prevented or at least (in comparison to an arrangement without appropriate damming agents) is slowed down, such that the impregnation agent builds up in the passages, preferably as far as the upper face of the composite pulp honeycomb support elements, i.e. as far as the face of the composite pulp honeycomb support elements from which the passages are filled. The coating method runs continuously, i.e. composite pulp honeycomb support elements are fed in continuously, so that the exposure time of the impregnation agent, or more particularly the complete filling of the passages by a damming process is limited in time, since downstream of the filling station the composite pulp honeycomb support elements arrive at a draining station, in which excess impregnation agent, in particular under the action of gravity, can flow out again through the passages downwards.

By means of the invention a continuously operating coating device is therefore created, and a coating method is proposed in which impregnation agent flows, preferably at atmospheric pressure, from above into the passages, preferably aligned at right angles to a direction of feed, and is built up in the latter for a limited period of time until it flows past appropriate damming agents, preferably such that the passages are coated over the whole of their periphery; this can be achieved in that the impregnation agent is built up at least as far as the upper edge of the passages, preferably even above the latter, i.e. it is particularly expedient if the feed velocity is coordinated with the filling velocity, i.e. the flow velocity of the impregnation agent into the passages, such that impregnation agent builds up for a certain period of time on the upper face of the composite pulp honeycomb support elements. In that the composite pulp honeycomb support element, in particular continuously, very especially preferably during the filling process, is moved further in the direction of feed to a draining station the action of the impregnation agent in the filled passages is small in terms of time, i.e. the risk of an impermissibly severe softening of the composite pulp honeycomb support elements, and thus damage to the honeycomb structure, is advantageously avoided.

Furthermore in accordance with the invention vibration means are advantageously provided at the draining station; with these the composite pulp honeycomb support elements, whose passages are still filled with impregnation agent, at least in some sections, can be set into vibration so as to aid, in particular to accelerate, the drainage process. It has proved to be particularly advantageous if the impregnation agents mandate at least one roller, which furthermore is preferably arranged underneath a conveyor belt for the purpose of transporting the honeycomb elements, in order by this means to set an optional conveyor belt of the means of conveyance into vibration, on which belt the composite pulp honeycomb support elements are transported in the direction of feed. Needless to say, it is also conceivable to subject the composite pulp honeycomb support elements directly to the action of a vibration roller.

As stated, it is particularly preferable if the filling station is designed such that a pouring curtain is formed extending transversely to the direction of feed, in which impregnation agent flows downwards, wherein the composite pulp honeycomb support elements are transported with the aid of means of conveyance through the said pouring curtain.

In overall terms a comparatively cost-effective device is proposed, together with a method that can be implemented cost effectively, which in comparison to the methods of known art is distinguished in terms of a high throughput, and low energy consumption.

The impregnation agent preferably takes the form of a cement-water mixture, i.e. of a cement paste, in particular, comprising micro-cement. Additionally or alternatively, other, preferably inorganic, suspensions can be deployed, which preferably contain water.

The composite pulp honeycomb support elements are preferably at least approximately rectangular in shape and have a length in the direction of feed and a width at right angles to the latter, which are greater than the height, as measured in the direction of the longitudinal extent of the axial passages running at right angles to the direction of feed and at right angles to the width. The height of the composite pulp honeycomb support elements is preferably between 5 cm and 35 cm, and very particularly preferably between 10 cm and 30 cm.

Instead of rectangular-shaped composite pulp honeycomb support elements, composite pulp honeycomb support elements in the form of cylindrical disks, for example, can also be coated using the inventive method, and using the inventive coating device.

With regard to the configuration of the composite pulp honeycomb support elements various options are possible. What is essential is that the honeycomb body takes the form of one having axial passages made of pulp, in particular of paper or board. The latter can be manufactured in various ways in a manner known per se, for example by the glueing together of a plurality of plies of corrugated board. Alternatively the composite honeycomb support element is formed from a so-called expanded honeycomb body, i.e. it is manufactured from a honeycomb element that can be pulled apart, for which purpose kraftliner papers, testliner papers, or bogus papers are suitable in principle.

As has been indicated previously it is particularly expedient if the impregnation agent, preferably comprises a cement mixed with water, in particular a cement mix, particularly preferably a mixture of micro-cements, and/or water glass, and/or inorganic suspensions, preferably a mixture of water with an inorganic binding agent, such as, for example, cement or lime.

It is particularly expedient to prepare the composite pulp honeycomb support elements for coating in the filling station, in that the composite pulp honeycomb support elements are initially wetted ahead of the filling station in the direction of feed at a wetting station, in particular in that, the passages, i.e. the internal peripheral walls of the passages are subjected to steam and/or hot water, wherein it is particularly expedient if appropriate spraying means, in particular nozzles, are provided in the region of the wetting station ahead of the filling station in the direction of feed.

A particularly expedient form of embodiment is one in which the means of conveyance have passageways, which preferably extend at right angles to the direction of feed, wherein excess impregnation agent can flow out through these openings, in particular into a collecting vessel. With regard to the particular design of the passageways various options are possible. Thus it is conceivable to provide, as the means of conveyance, rollers that are spaced apart in the direction of feed, wherein the passageways are formed by the spaces between the rollers. Additionally or alternatively the means of conveyance can comprise a conveyor belt, which preferably is not designed as a traditional closed surface belt, but comprises load-supporting bars that are spaced apart from one another in the direction of feed, which bars are attached to one another, in particular at their lateral end regions, in the direction of feed, wherein the impregnation agent can flow out through the spaces in the direction of feed between two adjacent load-supporting bars. Also conceivable is a perforated belt or a similar means of conveyance, which allows the passage of impregnation agent from top to bottom.

Also with regard to the particular design of the damming agent, for the purpose of damming or building up the impregnation agent in the passages in the region of the filling station, various options are possible. The damming agent preferably comprises a sheet-type element, for example one made of metal, i.e. a damming sheet. The damming agent is therefore preferably designed as a panel element, which is located in a region underneath the composite pulp honeycomb support elements that are transported over the latter. With regard to the arrangement various options are again possible. Thus it is conceivable that the composite pulp honeycomb support elements slide directly over the damming agents. Alternatively it is possible and preferable if the damming agents are located in a region underneath the means of conveyance, such that the impregnation agent can be dammed back up through the means of conveyance into the passages. With the phrase "underneath the means of conveyance", a form of embodiment is thereby also understood, which takes the form of a continuous means of conveyance, in particular a means of conveyance in the form of a belt, which runs from one end point of a conveyor section back to a starting region, and in which the damming agents are located underneath the section moving in the direction of feed, but above the section running in the return direction.

As already stated it is preferable if at least one collecting vessel is provided for the purpose of capturing excess impregnation agent. The said collecting vessel is preferably located in the vicinity of the draining station. Very particularly preferably the collecting vessel extends against the direction of feed as far as the filling station, so that excess impregnation agent can already be captured by the collecting vessel at that point. Needless to say, a plurality of collecting vessels can be provided as an alternative. It is now particularly expedient if pumping means are assigned to the at least one collecting vessel, with which impregnation agent is extracted from the collecting vessel, to be supplied to the passages of composite pulp honeycomb support elements that are to be newly coated.

In order to ensure permanently trouble-free operation it is preferable if an (automatic) cleaning station is assigned to the means of conveyance, at which the means of conveyance can be cleaned of adhering impregnation agent as it passes through. In other words, the sleeving and the means of conveyance pass through the cleaning station, in which the means of conveyance is automatically cleaned, for example with brushes and/or the high-pressure application of cleaning fluid.

Of particular advantage is a form of embodiment of the coating device in which the placement of the composite pulp honeycomb support elements that are to be coated onto the means of conveyance takes place automatically, in particular from a stack. For this purpose a lifting table is preferably assigned to a stack of composite pulp honeycomb support elements, from which the composite pulp honeycomb support elements are placed onto the means of conveyance, in particular they are slid into place. Additionally or alternatively, other manipulation devices are provided, such as, for example, a robotic arm, or similar placement equipment. Additionally or alternatively, it is preferable to provide stacking means for the automatic stacking of coated composite pulp honeycomb support elements, wherein it is particularly preferable if the composite pulp honeycomb support elements are not stacked directly on top of one another, but rather a separation sheet, in particular one made of plastic, is provided between two adjacent composite pulp honeycomb support elements.

It is very particularly preferable if the composite pulp honeycomb support elements are acquired at the end of the conveyor section by transfer means, wherein the transfer means are preferably designed such that the composite pulp honeycomb support elements, in particular by pushing forwards in each case a composite pulp honeycomb support element located at the front, are transferred onto the above-cited separation sheets, or stacking sheets, in particular they are slid into place.

BRIEF DESCRIPTION OF THE DRAWINGS

Further advantages, features, and details of the invention ensue from the following description of preferred examples of embodiment, together with the aid of the drawings, wherein:

FIG. 1: shows a detail of a multi-layer composite honeycomb support element, in particular one formed from a plurality of corrugated board plies glued together, which can be formed from a single, or a plurality of, corrugated board webs, and FIG. 2: shows a highly schematised side view of a coating device designed in accordance with the concept of the invention.

In the figures the same elements, and elements with the same function, are identified with the same reference symbol.

DETAILED DESCRIPTION

FIG. 1 shows a plan view onto a face of a composite pulp honeycomb support element 1 (here in the exemplary form of a corrugated board honeycomb body). The detail shown consists of three plies 2 (layers) glued together, wherein each ply 2 is formed from a flat carrier paper 3, which is glued together with a corrugated paper 4 to form (first) axial passages 5. The passages 5 are thus peripherally bounded by the corrugated paper 4 and the carrier paper 3. Furthermore each ply 2 comprises (second) passages 6, which in the example of embodiment shown are bounded by the above-cited corrugated paper 4 and a further carrier paper, namely the carrier paper of the adjacent (parallel) ply. In an alternative variant of embodiment, not illustrated, each ply 2 can also comprise two carrier papers, which accommodate the corrugated paper 4 between them in the form of a sandwich. In this case the (second) passages 6 are bounded by the paper and a carrier paper 3 of the same ply.

As can be seen in FIG. 2, the plies 2 are curved. This is because the composite pulp honeycomb support element 1 has been manufactured by winding up a corrugated board web, as described, for example, in DE 103 05 747 A1, i.e. the individual plies 2 consist of the same corrugated board web. In an alternative method of manufacture the plies 2 are formed from separate corrugated board web lengths, which are laid one upon another and glued together. What is essential is simply that a multiplicity of axial passages 5, 6 are formed, which are provided with an impregnation coating, for example with the aid of the method described in FIG. 2.

FIG. 2 shows a coating device 7 in a highly schematised form. The latter comprises rotationally driven means of conveyance 8, with which composite pulp honeycomb support elements 1 are transported from treatment station to treatment station.

A core operation station is a filling station 9, comprising a storage container 10 for the impregnation agent 12 above the means of conveyance 8. Here an exemplary form of pivotable closure device 11 is assigned to the storage container 10; after the closure device has been opened, impregnation agent 12, here a water-cement mixture, can flow out, here exclusively under the action of gravity at atmospheric pressure, downwards onto an upper face 13 of a composite pulp honeycomb support element 1. With the aid of the means of conveyance 8 the composite pulp honeycomb support elements 1 are transported past under the curtain flowing out of the storage container 10, wherein the impregnation agent can flow through axial passages, not shown in the figure and extending from top to bottom at right angles to a direction of feed F, as far as the means of conveyance 8, and by means of passageways 14 through the means of conveyance 8 into a collecting vessel 15. In order that the impregnation agent 12 does not flow directly, that is to say, without retardation, through the passages 5, 6, damming agents are provided in a region underneath the out-flowing curtain of impregnation agent, that is to say, in the region of the filling station 9, here in the form of a metal sheet, which is located in a region underneath the means of conveyance 8, and which ensures that the impregnation agent 12 builds up in the passages 5, 6, at right angles to the direction of feed F, as far as the upper face 13.

As can be seen from FIG. 2, the composite pulp honeycomb support elements 1 are located, with a lower face 17 extending parallel to the upper face 13, on the means of conveyance 8, or more precisely on load-supporting bars 18, spaced apart in the direction of feed F, between which are formed the passageways 14 for the impregnation agent 12. The load-supporting bars 18 are flexibly connected with one another in the form of a conveyor belt, or a conveyor chain, or similar, In the interest of clarity the load-supporting bars 18 are not represented in full.

It can be seen that the impregnation agent 12 continues to be built up on the upper face 13 of the composite pulp honeycomb support elements 1 after the curtain has been passed, wherein, after passing the damming agents 16, the composite pulp honeycomb support elements 1 arrive at a draining station 19 located in the direction of feed F, at which station excess impregnation agent 12 can flow downwards through the passageways 14 into the collecting vessel 15. For the purpose of aiding the drainage process vibration rollers 20 are provided in a region underneath the conveyor belt, or more generally, the means of conveyance 8, wherein instead of rollers, other vibration means can be provided. By means of the vibrating rollers 20 the means of conveyance 8 are set in vibration in the region of the draining station 19, and thus also the composite pulp honeycomb support elements 1, which leads to a rapid and sufficient drainage of excess impregnation agent 12 from the passages 5, 6.

It can be seen that a wetting station 21 is arranged upstream of the filling station 9, in which, for example, water vapour or hot water is sprayed into the passages 5, 6 by means of a nozzle 22, in the example shown, from above, to provide an initial wetting process.

It can furthermore be seen that an automated cleaning station 23 is provided in a lower return section of the means of conveyance 8 for the purpose of cleaning the means of conveyance 8.

Furthermore it can be seen in FIG. 2 that placement equipment 24 is assigned to the means of conveyance 8 for the purpose of automatic loading of the means of conveyance 8. Transfer means 25 are located downstream of the draining station 19, with which the coated composite pulp honeycomb support elements 1 are transferred across onto stacking sheets 26, which are then automatically stacked with the aid of stacking means 27. The stacking means 27 and/or the placement equipment 24 each preferably comprise a lifting table, so that placement of the composite pulp honeycomb support elements can always take place at the same height, and likewise they can always be stacked and fed out at the same height.

The sequence is as follows. A composite pulp honeycomb support element 1 that is not yet coated is firstly supplied to the means of conveyance 8, and is transported by the latter to the wetting station 21, where the passages 5, 6 are initially wetted. By virtue of a continuous movement of the means of conveyance 8 the composite pulp honeycomb support element 1 then arrives at the filling station 19, through which it is transported, and at the same time the passages 5, 6 are filled with impregnation agent 12, wherein the outflow of the latter is slowed down with the aid of damming agents 16. At a draining station 19 located downstream in the direction of feed F, excess impregnation agent 12 can flow out of the passages 5, 6 downwards into a collecting vessel 15, from which impregnation agent 12 is supplied back to the filling station 19. The drainage process is supported with the aid of vibration means, which here, for example, comprise rollers 20. The drained composite pulp honeycomb support elements 1 subsequently arrive at a transfer device 25, and from there to stacking means 27, where they are stacked, with stacking sheets 26 arranged in between them.

The invention claimed is:

1. A coating device for coating composite pulp honeycomb support elements (1), each having a multiplicity of passages (5, 6) extending in an axial direction, with an impregnation coating for the purpose of increasing the fire and/or water resistance and/or the mechanical stability of the support elements, comprising a conveyor (8) for transporting the composite pulp honeycomb support elements (1) in a direction of feed along a filling station (9), wherein the conveyor is designed so that an impregnation agent (12) is filled from above into the passages (5, 6) of the composite pulp honeycomb support elements (1), damming agents (16) positioned relative to the filling station (9) for reducing downward flow of the impregnation agent (12) out of the passages (5, 6) such that the impregnation agent (12) is built up in the passages (5, 6) up to an upper face of the composite pulp honeycomb support elements (1), and a draining station (19) arranged downstream of the filling station (9) in the direction of feed, at which draining station excess impregnation agent (12) can drain out of the passages (5, 6) of the composite pulp honeycomb support elements (1), and wherein, at the draining station (19), vibration means (20) are provided for the purpose of setting the composite pulp honeycomb support elements (1) into vibration, for aiding the drainage process.

2. The coating device according to claim 1, wherein a wetting station (21) is provided ahead of the filling station (9) in the direction of feed, for the purpose of initially wetting the passages (5, 6) before filling with the impregnation agent (12) at the filling station (9).

3. The coating device according to claim 1, wherein the conveyor (8) has passageways (14), through which excess impregnation agent (12) can flow downwards in the region of the draining station (19).

4. The coating device according to claim 1, wherein the conveyor (8) comprises conveyor rollers and a conveyor belt spaced apart in the direction of feed, and further comprises load-supporting bars (18) spaced apart in the direction of feed for the composite pulp honeycomb support elements (1).

5. The coating device according to claim 1, wherein the damming agents (16) comprise a damming sheet, which is arranged underneath the conveyor (8), wherein the impregnation agent (12) is dammed back up through the conveyor (8) into the passages (5, 6).

6. The coating device according to claim 1, further comprising a collecting vessel (15) positioned to receive the impregnation agent (12) from the draining station (19), wherein the collecting vessel (15) extends as far as under the filling station (9).

7. The coating device according to claim 6, further comprising pumping means for pumping the impregnation agent (12) out of the collecting vessel (15) and feeding it back to the filling station (9).

8. The coating device according to claim 1, further comprising a cleaning station (23) for removing impregnation agent (12) from the conveyor (8).

9. The coating device according to claim 1, further comprising placement equipment (24) for the automatic placement of the composite pulp honeycomb support elements (1) to be coated onto the conveyor (8), and stacking means (27) for the automatic stacking of coated composite pulp honeycomb support elements (1).

10. The coating device according to claim 9, further comprising transfer means (25) for arranging coated composite pulp honeycomb support elements (1) from the conveyor (8) on stacking sheets (26).

11. A coating method for coating composite pulp honeycomb support elements (1), each having a multiplicity of passages (5, 6) extending in an axial direction, with an impregnation coating for the purpose of increasing the fire and/or water resistance and/or the mechanical stability of the support elements, comprising the steps of: transporting composite pulp honeycomb support elements (1) in a direction of feed along to a filling station (9) wherein an impregnation agent (12) fills the passages (5, 6) of the composite pulp honeycomb support elements (1), and wherein damming agents (16) are positioned to slow flow of the impregnation agent (12) out of the passages (5, 6) downwards such that the impregnation agent (12) builds up in the passages (5, 6), up to an upper face of the composite pulp honeycomb support elements (1), and arranging a draining station (19) downstream of the filling station (9) in the direction of feed, wherein, at the draining station, excess impregnation agent (12) drains out of the passages (5, 6) of the composite pulp honeycomb support elements (1), and vibrating the composite pulp honeycomb support elements (1) at the draining station (19).

12. The coating method according to claim 11, wherein, at the filling station (9), the impregnation agent (12) is built up in the passages (5, 6) to the extent that a surface of the composite pulp honeycomb support elements (1) is covered in the filling region by the impregnation agent (12) to a height above the surface of the composite pulp honeycomb support elements (1) in the filling region of at least 0.5 cm.

13. The coating method according to claim 12, wherein, at the draining station (19), excess impregnation agent (12) flows downwards through passageways (14) in the conveyor (8) for the composite pulp honeycomb support elements (1).

* * * * *